April 14, 1959
O. WITTEL
2,881,657
CONTINUOUS PROJECTOR HAVING MEANS FOR ELIMINATING FLICKER
Filed June 3, 1954
2 Sheets-Sheet 1
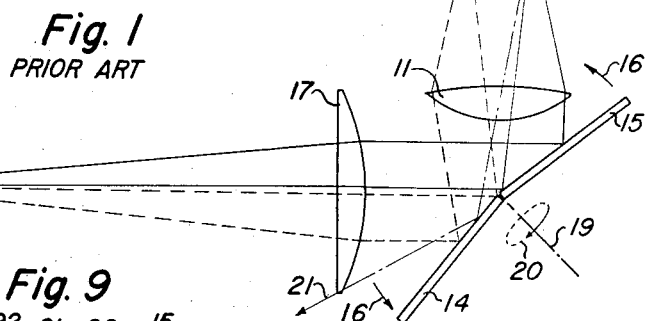
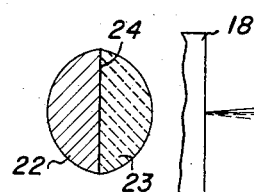
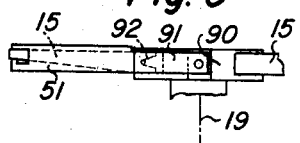
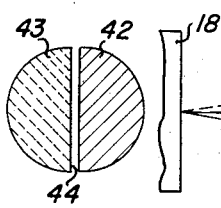
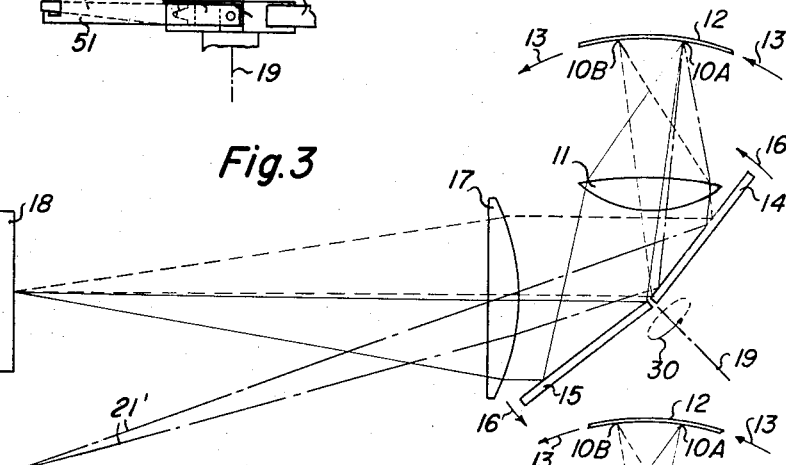
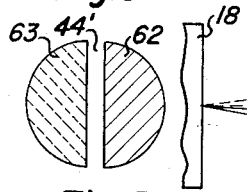
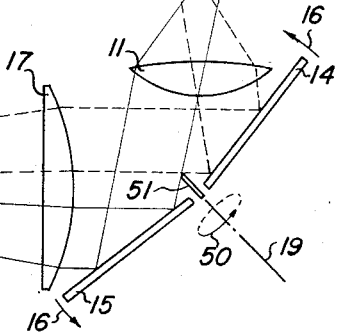
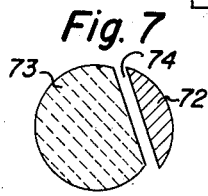
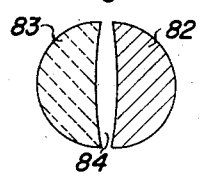
OTTO WITTEL
INVENTOR.
BY Daniel I. Mayne
Harold F. Bennett
ATTORNEY & AGENT April 14, 1959     O. WITTEL     2,881,657
CONTINUOUS PROJECTOR HAVING MEANS FOR ELIMINATING FLICKER
Filed June 3, 1954     2 Sheets-Sheet 2
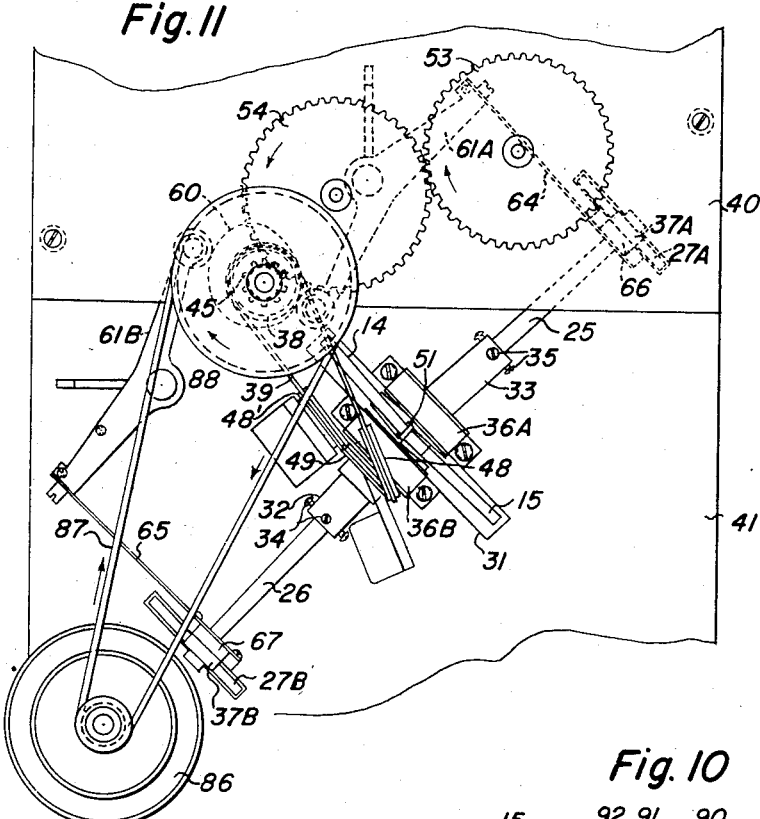
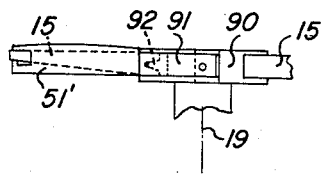
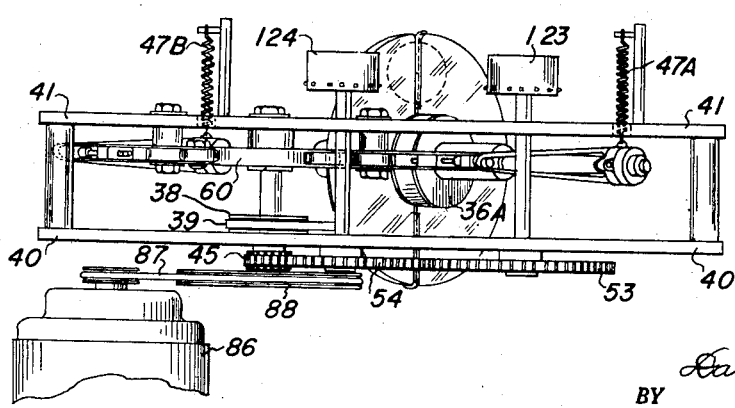
OTTO WITTEL
INVENTOR.
BY Daniel I. Mayne
Harold F. Bennett
ATT'Y & AG'T

2,881,657
CONTINUOUS PROJECTOR HAVING MEANS FOR ELIMINATING FLICKER

Otto Wittel, Rochester, N.Y., assignor to Eastman Kodak Company, Rochester, N.Y., a corporation of New Jersey Application June 3, 1954, Serial No. 434,135

2 Claims. (Cl. 88—16.8)

This invention relates to the projection of motion pictures from continuously moving film and particularly to the use of such projection in television broadcasting and is an improvement upon the invention disclosed and claimed in my earlier copending application Serial No. 303,230, filed August 8, 1952, now Patent No. 2,780,133, issued February 5, 1957.

It is an object of the invention to provide a continuous-feed motion-picture machine, the speed of which can be varied with respect to the speed of scanning in television projection. It is a further object of the invention to provide such a machine in which the change-over from one frame to the next takes place without a dark boundary passing across the picture and without any perceptible variation in total illumination, whereby the brightness of the scanning spot is substantially independent of the phase of the film advance.

In my earlier application the prior art is briefly reviewed, the difficulties inherent in certain types of continuous projectors are pointed out, and a continuous-feed projector is described which comprises a curved film gate, means for feeding film through the gate at a steady rate, a projection lens for forming an image of the film gate, preferably at infinity, a pair of semicircular plane mirrors in front of the projection lens and oriented diagonal to the axis of the projection lens whereby the image is thrown to one side of the axis of the lens, the mirrors being perpendicular to a plane called the base plane which passes through the axis of the lens and along the center of the film gate in the direction of travel of the film. As described therein, the mirrors are individually mounted on the adjacent ends of two rotatable shafts arranged end to end in a plane parallel to and to one side of the base plane by more than half the diameter of the projected light beam. This plane in which the two rotatable shafts lie is referred to therein as the plane of tilt. The adjacent ends of the two shafts are held stationary while the outer ends are tilted back and forth in the plane of tilt by cam means and at the same time the two semicircular mirrors are rotated so that they alternately intercept the beam of light, the rate of rotation being one revolution for each two frames of advance of the motion-picture film. This brings one mirror into the light beam for each successive frame of the motion-picture film. While each mirror is partly or completely in the beam, the cam imparts to it a uniform tilting motion at an angular rate equal to half the apparent rate of advance of the film as subtended at the rear nodal point of the projection lens. This causes the image as reflected by the mirror to remain stationary while the film is advancing. It is further noted therein that each mirror is in the beam of light during more than 180° of rotation; in practice, this amounts to about 270°.

The details of structure of the film feed, film gate, and illumination system and the bearings and cam means for tilting the mirrors are described in my earlier application, and an improvement on the film feed is described in a copending application, Serial No. 447,862 filed August 4, 1954. Furthermore, the particular importance of eliminating flicker in television projection is described in my earlier application and a means of reducing flicker in projectors of the tilting mirror type is described. An improved means of eliminating flicker is the subject of the present invention.

It is particularly important to eliminate flicker in television transmission because the picture is scanned by a flying spot 60 times a second in standard television transmission, whereas the standard rate of projection of motion-picture films is 24 frames per second. Accordingly, if there is any variation in the brightness of the picture according to the phase of the film advance, these variations will come repeatedly while the scanning spot is in certain parts of the picture area and will cause undesirable streaks and spots in the picture. Particularly if a dark band passes across the picture during the change-over, as occurs in some types of continuous projectors, this dark band which would be totally undetectable in theater projection would cause dark spots in certain parts of the picture area. Moreover, a pattern of irregular illumination would repeat 12 times a second, that is, for every two motion-picture frames or every five TV scannings, and thus would cause a very undesirable flicker in parts of the final image.

According to the present invention, a continuous motion-picture projector of the type using two semicircular rotating and independently tilting mirrors for compensating the motion of the film is made up in which the reflecting faces of the mirrors form an angle with each other smaller than a straight angle during the change-over period and a compensating mask in the form of a blade similar to a knife blade is attached to one edge of each semicircular mirror and extends in front of the mirrors slightly into the beam of light.

According to a preferred form of the invention, the blade is curved along its free edge to compensate differentially at different phases of the change-over.

The reason for the effectiveness of this mask is that, in contrast to other forms of plural mirror motion-picture projectors, each of the two mirrors presents effectively greater than a semicircular aperture, that is, greater than half the aperture of the projection lens, to the projection beam at the middle of the change-over so that the illumination of the screen without a mask would be greater than the illumination between change-over periods if there were no gap between the two mirrors. According to one feature of my earlier invention, means were provided for maintaining the gap between the mirrors at as nearly a uniform width as possible, but it proved difficult to do this mechanically with sufficient accuracy to eliminate flicker to a degree required in television transmission. The advantage of the present invention is that the blade or mask shadows the free edge of the other mirror during the change-over so that the gap between the mirrors can vary considerably without affecting the total illumination in the projected image. It does not matter whether the blade is attached to the leading edge of one mirror or to the following edge of the other mirror, for in one case it shadows the free edge of the other mirror so that light from the projection lens does not reach it and in the other case it shadows it so that light reflected from the free edge of the other mirror does not reach the projection screen.

Preferably, as in the earlier invention, a focusing lens is provided in the reflected beam when the image is to be projected onto a screen at finite distance, so that the mirrors work in collimated or substantially collimated light.

In the accompanying drawings:

Fig. 1 is a diagrammatic axial section of the optical system of a continuous projector according to the prior art.

Fig. 2 is a diagrammatic view of the exit pupil of the optical system of Fig. 1.

Fig. 3 is a diagrammatic section of the optical system of the projector shown in my copending application.

Fig. 4 is a diagrammatic view of the exit pupil of the system of Fig. 3.

Fig. 5 is a diagrammatic axial section of the optical system of a continuous projector according to the invention.

Fig. 6 is a diagrammatic view of the exit pupil of Fig. 5 according to one form of the invention.

Fig. 7 corresponds to Fig. 6 taken during a different phase of the change-over interval.

Fig. 8 is a diagrammatic view of the exit pupil of the system of Fig. 5 according to another form of the invention.

Fig. 9 is an edge view of one of the semicircular mirrors showing the masking blade.

Fig. 10 is an edge view of one of the semicircular mirrors showing a preferred form of the masking blade.

Fig. 11 is a side view of a projector mechanism embodying the invention.

Fig. 12 is a top view of the projector mechanism shown in Fig. 11.

Fig. 1 is a diagrammatic showing of a projector according to the prior art. Light from the film gate 12 passes through the objective lens 11 to the diagonal compensating mirrors 14, 15, which reflect the light to the left through the auxiliary lens 17 to the image plane which may be thought of as the face of a television tube 18.

The film gate 12 has a large enough opening to expose slightly more than two frames of a movie film to the objective 11, and preferably it is concave toward the objective, at least in the plane of the direction of film movement shown by the arrows 13. Preferably the center of curvature is at or near the back nodal point of the lens 11. The lens 11 is shown diagrammatically as a simple positive element, but in practice it is complex in structure and is highly corrected for all the aberrations except that the field is curved to fit the curvature of the gate 12 rather than being flat, as is more usual in photographic objectives. The aperture of the objective 11 is determined largely by the requirements of the intensity of illumination, and the complexity thereof is determined largely by the aperture and sharpness of imagery required. In practice, I have found either the Petzval type and its modifications or the Gauss type objective suitable at apertures of about $f/2$.

The objective 11 is focused on the gate 12 and throws collimated light onto the optical compensator mirrors 14 and 15. Light from the center point 10B of one frame of the film is shown in broken lines and light from the center point 10A of the next following frame is shown in full lines. These two beams of light emerge from the front of the objective 11 as two intersecting parallel beams and strike the two mirrors 14, 15 whose normals make half the angle with each other that the light beams do, and accordingly upon reflection the two parallel beams are combined into a single parallel beam which strikes the auxiliary lens 17 and is focused thereby upon a single point in the image plane. The image is ordinarily enlarged in projection, and so the lens 17 has a longer focal length than the lens 11, works at a correspondingly lower aperture and is much simpler in construction. The invention is not limited to this degree of enlargement, however, as in some forms intended for projection at unit magnification, lenses 11 and 17 are equal in focal length and may be considered as making up two halves of an objective, while in other forms the lens 17 is omitted and the rays from the objective 11 are very slightly convergent and proceed to a distant screen where they form the image. The basic principle involved is that the light is rendered substantially parallel or collimated when it strikes the compensating mirrors 14, 15, so that only the angle of tilt of the mirrors is effective and any translatory motion normal to the surface thereof does not throw the image out of focus.

In order to project a stationary image of the moving film, the mirrors 14, 15 are tilting in a counterclockwise direction as indicated by the arrows 16 at a constant angular rate corresponding to one half the angular rate of apparent motion of the film so that as the film proceeds through the film gate and the rays of light from any one point in the film change from the direction shown in full lines to the direction shown in dotted lines, the reflected rays remain constant in their direction.

The action of the compensating mirrors, 14, 15, is described in greater detail in my earlier application. Briefly, after each frame of the motion-picture film has begun to enter the film gate area 12, a mirror is moved edgewise into the optical beam and is moved across the beam and out of the beam on the other side before that particular frame of the film has completely left the film gate. While the mirror is in the beam, it is continuously tilted (counterclockwise in Figs. 1, 3 and 5) in a direction indicated by the arrows 16 and at an angular rate which causes the image on the projection screen or television tube 18 to remain stationary. Thus a single mirror may be visualized as passing first through the position indicated by the mirror 15 when the center of the film frame is at the point 10A and then proceeding to the position indicated by mirror 14 when the same frame has reached the position 10B and continuing in the same path until it is completely out of the optical beam. Then as the next frame of film follows through the film gate, the next mirror follows in the same path through the optical beam. The period of time when two mirrors are each partly in the beam is called the change-over interval or change-over period. One of the known ways of getting the mirrors into and out of the beam is to make the two mirrors 14, 15 up as two semicircular mirrors and to rotate them around an axis 19 which lies outside the plane of the diagram. For the sake of definiteness it is described as behind that plane. The direction of rotation accordingly is indicated by the arrow 20. It may be noted that there is some stray light arising when light strikes the wrong mirror during the change-over interval, but this stray light is directed so far from the image area 18 as indicated by the ray 21 that it is easily masked off.

An illuminating system of conventional design is provided behind the film gate or optionally, for television purposes, the film gate is scanned with a spot of light. Also, more or less conventional means of advancing the film (not shown) through the film gate 12 are provided. However, since unequal degrees of film shrinkage in different samples of film has a more noticeable effect in continuous projectors than in intermittent projectors, it is usual to provide some means of film shrinkage compensation. One means of film shrinkage compensation which is advantageous and which I prefer to use in conjunction with my invention is described in my copending application, Serial No. 447,862 previously mentioned.

Fig. 2 is a diagrammatic view of the exit pupil of the optical system shown in Fig. 1, at the midpoint of the change-over period. It may be observed from Fig. 1 that the usable beams of light outlined in full and dotted lines respectively fill less than the full aperture of objective 11, the port of the aperture which is not filled being a strip across the center of the objective. By following the paths of the rays in Fig. 1, it is seen that these two less-than-semicircular parts of the aperture of objective 11 are brought substantially in contact with each other by the mirrors so that the exit pupil appears roughly as a somewhat flattened circle made up of the two fields 22, 23, Fig. 2, shaded in dotted and in full lines corresponding to the showing of the rays in Fig. 1. These fields are separated by the boundary 24, Fig. 2. It is obvious that when one mirror alone intercepts the full optical beam passing through lens 11, then the exit pupil will be a full circle and that accordingly, the exit pupil of Fig. 2 represents a decrease in illumination during the change-over period. In practice, this results in a periodic flicker which was referred to above in the statement of the invention and which gives rise to shadow areas in the image due to the cyclical relationship of the projector on the one hand and the scanning spot on the other.

Fig. 3 is a diagram corresponding to Fig. 1, showing features of the projector described in my earlier application mentioned above. The film gate 12, the direction of film feed 13, the lenses 11, 17, the image area 18, the axis of rotation 19, the angle between the normals to the mirrors, and the direction of tilt 16 correspond to Fig. 1. In order to correct the decrease of illumination during the change-over period, however, I have reversed the direction of rotation of the mirrors 14, 15, as indicated by the arrow 30, and have made up each mirror as the opposite half of its full circular outline from that of Fig. 1. It will be noted that accordingly the dihedral angle between the faces of the mirrors is less than 180° by half the angle between the two bundles of parallel rays originating from points 10A and 10B respectively. The useful light from the point 10A of the film gate now passes through the left-hand half of the lens 11 in the diagram and the useful light from the point 10B, indicated by dotted lines, now passes through the right-hand half of the lens 11. Now, instead of a gap between the two beams at the center of the lens 11, the two beams actually overlap. Fig. 4, corresponding to Fig. 2, shows the resultant exit pupil at the midpoint of the change-over period. In this case the exit pupil is made up of two halves of somewhat more than semicircular outline, and they are reversed in their relative position as compared with Fig. 2. The boundary between the two halves of the exit pupil is shown as a narrow band in this case to indicate the small gap between the two mirrors 14, 15, in Fig. 3. A similar small gap could logically have been shown in Fig. 2, but the single boundary line 24 was used in Fig. 2 to indicate that even if there is no gap between the mirrors (as may be the case in some forms of continuous projectors), the illumination at best during the change-over period is less than at other times in the cycle. A feature of my earlier invention was a means for keeping the gap 44 between the two halves 42, 43 of the exit pupil at a constant width so as to reduce the amount of flicker. However, it was found not to be practical to provide means for keeping this gap uniform enough to eliminate the flicker to a satisfactory degree for television transmission Of course light from point 10A also passes through the other half of the objective 11 and strikes the wrong mirror 14, as shown for example by rays 21' (drawn in dot and dash lines) very much as in the prior art. However, because of the angle between the mirrors, these rays are reflected in a different direction from the useful rays, in accordance with the well-known law of reflection, and are focused to one side of the image receiver 18. Similar rays (not shown) from point 10B are similarly reflected from mirror 15 off to the other side of the image receiver 18. Except for being reversed in position with respect to the image receiver and except that possibly more stray light passes through the lens 17, this effect is quite like that in the prior art.

Fig. 5 is a diagram corresponding to Fig. 3 and showing a projector according to the present invention whereby the flicker is completely eliminated. Fig. 5 corresponds closely to Fig. 3, that is, every detail of Fig. 3 has a counterpart in Fig. 5 and the rotation and tilting of the mirrors is the same. The improvement, and the heart of the present invention, lies in the provision of a little blade-shaped strip of material 51 for masking the edges of the mirrors. This strip of material, preferably metal, extends from within or behind the gap between the mirrors to a point in front of the mirrors so that it masks the trailing edge of the mirror 14 from the focusing lens 17 and masks the leading edge of the following mirror 15 from the projection objective 11. In other words, part of the light coming from the leading frame of film 10B represented by the broken lines is stopped after reflection from mirror 14 and similarly light from the following frame of film 10A represented in solid lines is stopped before striking the leading edge of the following mirror 15.

Fig. 6 shows the appearance of the exit pupil of the projector according to the invention at the midpoint of the change-over period. The masking blade 51 (Fig. 5) is chosen to have such a width that there remain two full semicircular areas 62 and 63 in the exit pupil corresponding to the areas 42 and 43 of Fig. 4 with a gap 44' between them representing the shadow of the masking blade 51. The width of the masking blade is determined by well-known principles (see for example chapter 5 of Hardy and Perrin "The Principles of Optics," McGraw, 1932, and Fig. 26 of Habell and Cox "Engineering Optics," Pitman 1948) to make the two areas substantially semicircular and to make the brightness of the screen at the midpoint of the change-over interval equal to the brightness when the full pupil is reflected in one mirror. While this does not guarantee that the brightness is the same at other instants during the change-over interval, it is a first approximation and is a close enough approximation for most purposes.

As shown in Fig. 5, the top edge or front edge of the mask 51 is located approximately at the intersection point of two rays from the center points 10A and 10B of the two frames and both passing through the center of the aperture of the objective 11, the intersection in question occurring when one ray recrosses the other after being reflected and at the middle of the change-over interval. These two rays are designated as "central rays" in the appended claims.

Fig. 7 corresponds to Fig. 6 except that it is taken at a later instant in the change-over interval, and illustrates a second order effect which is likely to cause very slight irregularities in the brightness of the screen. If the axis of rotation were at a great distance from the optical beam, the shadow band 64 of Fig. 6 would move substantially sideways and the area lost from the one part of the pupil would be substantially exactly balanced by area gained in the other part of the pupil. However, in practice, it is much more convenient to have a moderately short distance from the optical beam to the center of rotation 19 and consequently the shadow band 64 swings into the diagonal position 74 in Fig. 7, separating the two parts of the pupil areas 73 and 72. In this diagonal position, if one were to view the blade 51 (Fig. 5) from the point of view of the objective 11 or the lens 17, one would be looking somewhat along the blade rather than straight across it as shown in Fig. 5 and consequently the area blocked out by the blade is narrower than when viewed directly from the side as shown in Fig. 5. This narrowing of the band is slightly exaggerated in Fig. 7 but it tends to increase the illumination to two maxima at roughly ⅕ and ⅘ of the way through the change-over period. Although these peaks represent only a very slight increase in brightness, they are objectionable when extremely steady illumination is required.

Fig. 8 is a diagram of the exit pupil corresponding to Fig. 6 and illustrating a method of overcoming even this slight second order flicker. In this form of the invention, the blade 51 (Fig. 5) does not have a straight edge at its forward edge but is convex so that it is higher in the center than at the two ends but of the same average height as in Fig. 5. The highest point may be at the center of the optical beam or slightly farther from the rotation axis 19 than is the center of the optical beam. The blade is higher at the center in this form of the invention than in the form illustrated in Fig. 6 but lower at the ends so that the area of the shadow band 84 is equal to the area of the shadow band 64 of Fig. 6 and likewise the areas of the two halves of the exit pupil 82 and 83 are respectively equal to the areas 62 and 63 of Fig. 6 at the mid-point of the change-over period. It will be obvious without reference to a further diagram that when the blade in this form of the invention rotates to the position illustrated by the band 74 of Fig. 7, then the narrowest points of the band 84 extend beyond the boundaries of the exit pupil and that the remaining part of the shadow band is wider in the form shown in Fig. 8 than in the form shown in Figs. 6 and 7 and that consequently the remaining areas of the two parts of the exit pupil will be smaller than the areas 72, 73 of Fig. 7. By giving the edge of the blade an appropriate convexity along its length the brightness of the screen is kept uniform within as close limits as can be measured, and the last trace of flicker is eliminated.

Whereas in the form of the projector shown in Fig. 3, it is necessary to provide means to keep the width of the gap between mirrors exactly uniform during the change-over period, an arrangement which requires accurately designed and machined parts and which is made difficult by the complicated relative motions of the two mirrors due to the tilting back and forth, it is not necessary to keep the gap between the mirrors constant within any high degree of accuracy in the present invention; it is only necessary to keep the edges of the two mirrors within the shadow band cast on the two sides of the blade 51. In this connection, it may be pointed out that the blade does not need to be at the center of the gap between the two mirrors.

Fig. 9 is a face view of the blade and an edge view of one of the semicircular mirrors 15. In actual practice, the mirror 15 is made thicker where it fits into the hub 90 than it is at the circumference to give it maximum strength and stability and to reduce the vibration. The mirror 15 is cut away at the center to fit into the hub 90 and is fastened therein by any suitable means such as clamping screws not shown. The hub 90 is also semi-circular in outline so that the other hub can hold the mirror 14 in substantially the same plane, as is shown in more detail in my earlier application. A spring clip 91 is fastened by a small screw to the flat side of the hub and a small indentation is formed in it or a small pin is set in it so that the blade 51 can be pushed under the spring clip 91 and a V-shaped notch 92 in the end of the blade fits over the pin or bulge on the underside of the spring clip. The V-shaped notch 92 is enlarged at its apex to form a pocket into which the pin or bulge fits, in a manner well known to machine designers, for holding the blade 51 in position. The outer end of the blade 51 is bifurcated and the two legs are bent around to fit above and below the edge of the mirror respectively, to prevent the rotation of the blade around the pin or bulge in the spring clip 91 and also to cause the blade 51 to stand out away from the flat edge of the mirror 15 slightly. The blade 51, however, does not stand out rigidly away from the edge of the mirror 15 but has a little give so that if the mirror 14 should push against it, it will cushion the shock slightly and thus make for a smoother working mechanism.

Fig. 10 corresponds to Fig. 9 in every respect except that a blade 51' with a convex edge is shown in place of the straight-edged blade 51, in accordance with a preferred feature of the invention.

Figs. 11 and 12 show right side and plan views of the mirror tilting and rotating mechanism of my earlier application modified to embody the present invention. In these figures the two mirrors 14, 15 are mounted respectively on the ends of the shafts 25, 26 and extend through slot 31 in the supporting plate 41. The mirrors are adjustably mounted on the shafts by means of collars 32, 33 which are adjustable relative to the shafts by screws 34, 35 to control the tilt in both directions. The shafts are mounted in bearings 36A and 36B at their adjacent ends and 37A and 37B at their outer ends. The bearings 36A and 36B are self-aligning ball bearings and may, for example, be of the type shown by reference numerals 33, 34, in 2,456,403 Goehring. The outer bearings 37A and 37B are spring-urged against the flat guides or rails 27A and 27B by springs 47A and 47B. The rails are omitted from Fig. 12 for clarity in showing the other parts. A motor 86 drives a pulley wheel 88 by means of a flexible belt 87. The pulley shaft is journaled in supporting plates 40, 41 and also carries a spur gear 45, a gear pulley 38 and a cam 60 for controlling the tilting of the mirrors. A rubber timing belt 39 of the type shown in U.S. 2,397,312 Forrest is driven by pulley 38, runs over idlers 48, 48' and drives gear pulley 49 pinned to collar 32 on the shaft 26 of mirror 15 to give the mirror 15 the required rotation. The other mirror 14 is rotated by mirror 15 operating through a universal joint, of which a preferred form is described in my earlier application. The pinion 45 drives the large spur gear 54 pinned to the shaft of sprocket wheel 124 and this spur gear drives the twin spur gear 53 pinned to the shaft of the other sprocket wheel 123. The sprocket wheels (not shown in Fig. 11) advance the film through a curved gate 12 (shown in Fig. 5), the film passing over one sprocket and under the other. It may be noted that the timing belt 39 permits the mirrors to range a few degrees ahead of or behind their theoretical angular position. This leeway is optically harmless and tends to decrease mechanical vibrations, and the mirrors are kept from getting permanently out of timing.

The tilting of the mirrors is accomplished in the following way. The cam 60 is cut with a uniform rise through about 240° and a quick smooth return through the rest of 360°. Two rocker arms 61A and 61B are rocked about their pivots by the cam 60 and are attached to the ends of the mirror shafts 25, 26 by straps or bars 64 and 65, respectively, the straps being attached to auxiliary bearings 66, 67 in which the shafts turn. It may be noted that the cam followers must be 180° apart on the cam to keep the mirrors' tilting in proper phase relationship, and they are held against the cam by springs, not shown.

The masking blade 51 is as shown in more detail in Fig. 9 or Fig. 10 and as described above with reference thereto.

While I have described my invention as embodied in a projector in which the mirrors are oriented diagonally to the axis of the objective, it is also useful in the known form of projector in which the mirrors are substantially orthogonal to this axis and reflect the light back through the objective. In this case, however, the mask or blade has a T-shaped cross-section, to shade the edges of the mirrors in effectively the same manner.

I claim:

1. An optical compensator for a continuous motion picture projector of the type comprising a film gate adapted to simultaneously display two successive frames of moving picture film and an objective for approximately collimating light from the film gate to form a projection beam wherein light rays from a pair of corresponding points in said two frames form two bundles of substantially parallel rays making an angle with each other, said compensator comprising two plane mirrors of semicircular outline with their straight sides adjacent to one another and their circular sides substantially concentric, means for supporting said mirrors diagonal to said projection beam with their common center to one side of the beam and for rotating them substantially about their common center for bringing them alternately into and out of said beam, means for tilting each mirror in the direction of apparent motion of the film while in the beam and in the opposite direction while clear of the beam and for maintaining the mirrors in such a position, during the interval when they are both partly in the beam, that the planes in which the mirrors lie form a dihedral angle whose vertex line is perpendicular to the plane containing the direction of tilt and whose magnitude on the side facing said objective is less than a straight angle by one-half of said angle between said two bundles of rays, and two masks each comprising a flat strip attached to the straight side of one of the mirrors along the part of the straight side which crosses the projection beam and extending in front of the mirrors approximately to the point of intersection of two central rays respectively from said two frames, one ray before it is reflected at one of the mirrors and the other ray after it is reflected at the other mirror, at the middle of said interval, each mask being adapted to intercept light in a strip covering the adjacent straight edges of said mirrors, while both are in the projection beam, whereby the area of the two mirrors in the beam at said middle of said interval is effectively equal to the area of the mirror in the beam when only one mirror intercepts the beam.

2. An optical compensator according to claim 1 in which each said mask has a convexly curved edge and extends above said intersection point of two central rays at the center of the mask and stops short of said intersection point at its ends.

References Cited in the file of this patent

UNITED STATES PATENTS

| | | |
|---|---|---|
| 1,025,074 | Ripley | Apr. 30, 1912 |
| 1,085,392 | Riper | Jan. 27, 1914 |
| 1,105,163 | Smith | July 28, 1914 |
| 1,606,002 | Thorgney et al. | Nov. 9, 1926 |
| 1,797,267 | Kosken | Mar. 24, 1931 |
| 1,937,353 | Miller | Nov. 28, 1933 |

FOREIGN PATENTS

| | | |
|---|---|---|
| 8,062 | Great Britain | of 1913 |